July 16, 1968
P. H. GAITHER IV, ET AL
3,393,354
ELECTRONIC MOTOR CONTROL SYSTEM EMPLOYING
PULSE GENERATING MEANS
Original Filed May 24, 1965
2 Sheets-Sheet 1
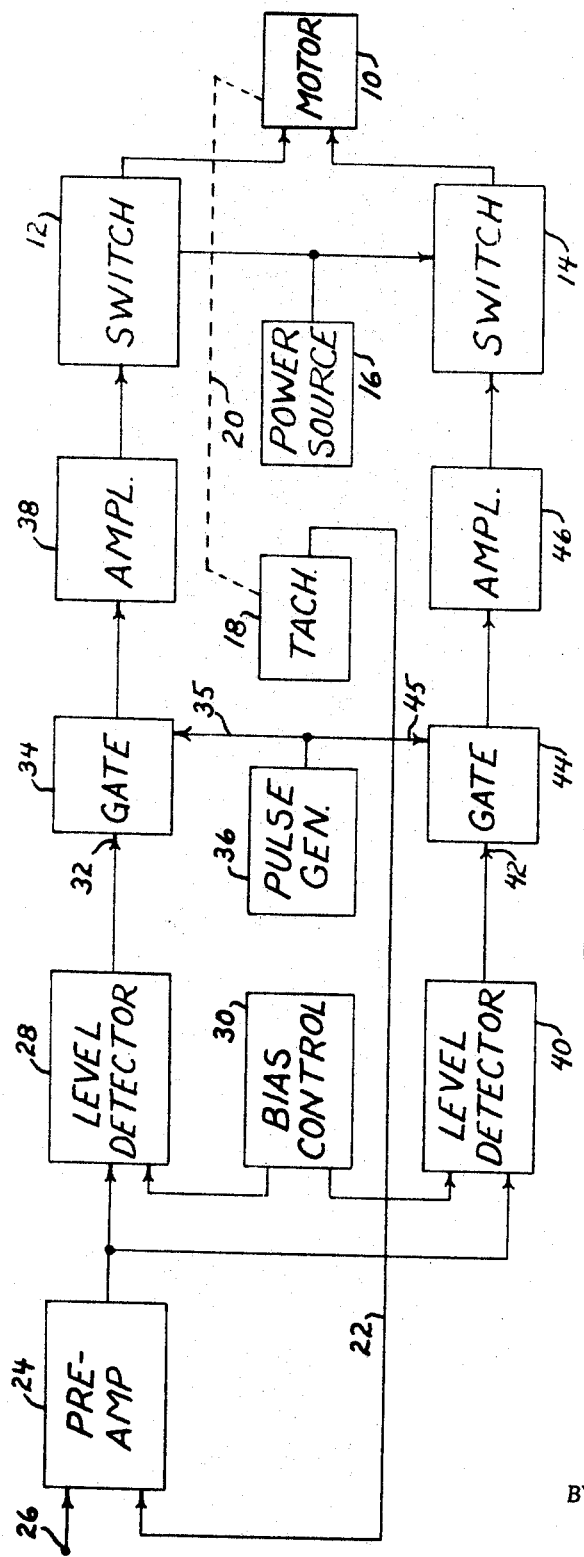
FIG. 1
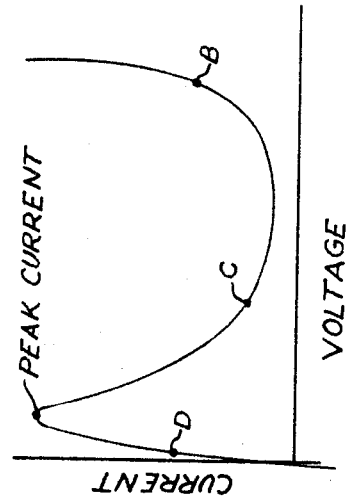
FIG. 3
FIG. 4
INVENTORS
PAUL H. GAITHER IV
FRITZ NORMAN LUTZ
BY Hoffmann and Yount
ATTORNEYS

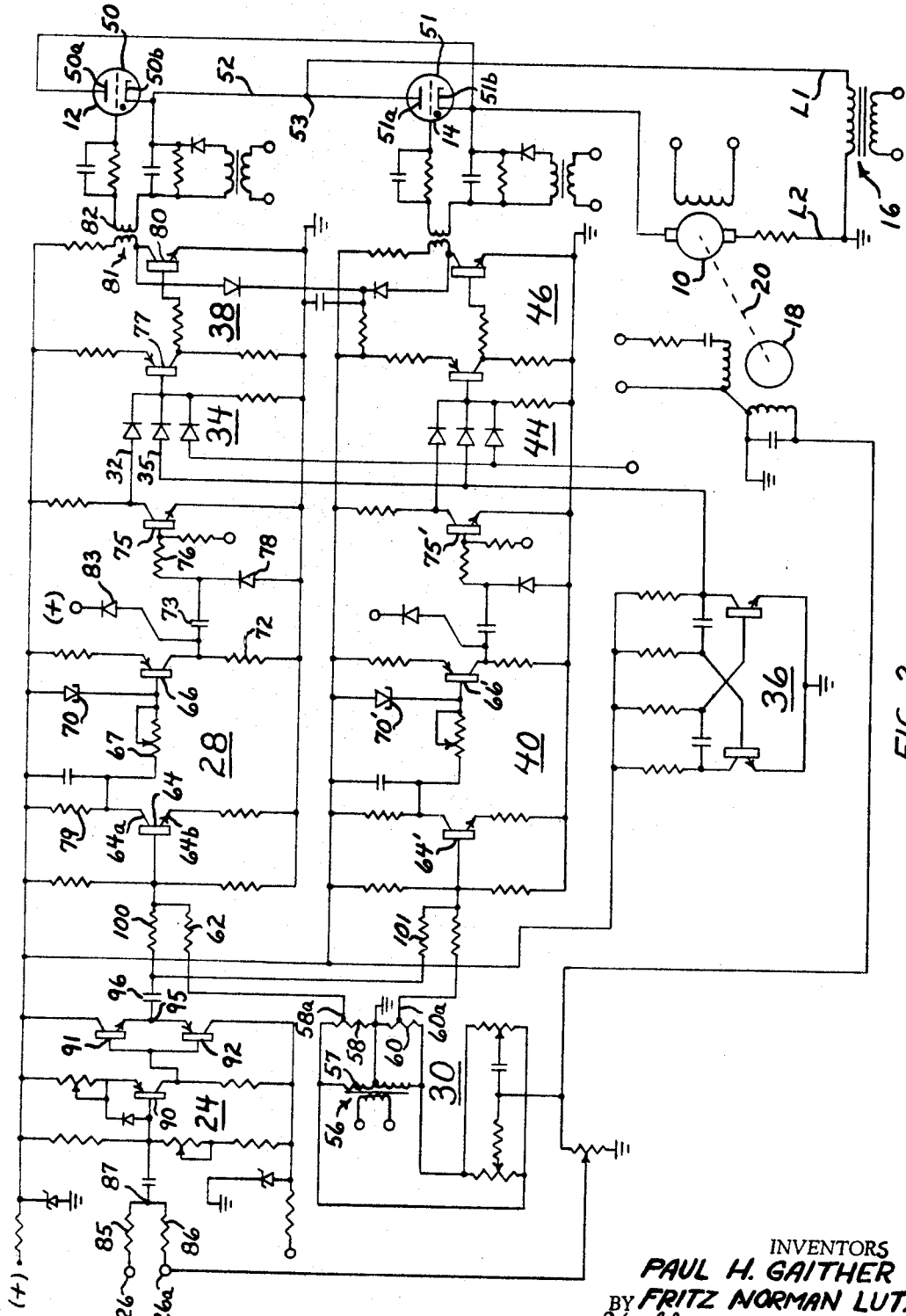

3,393,354
ELECTRONIC MOTOR CONTROL SYSTEM EMPLOYING PULSE GENERATING MEANS

Paul H. Gaither IV, Cleveland, and Fritz Norman Lutz, Middleburg Heights, Ohio, assignors to The Warner & Swasey Company, Cleveland, Ohio, a corporation of Ohio Continuation of application Ser. No. 458,184, May 24, 1965. This application Nov. 1, 1967, Ser. No. 679,932

22 Claims. (Cl. 318—341)

This is a continuation of application Ser. No. 458,184, filed May 24, 1965.

The present invention relates to an electronic control circuit and more particularly to electronic control circuits suitable for controlling an electric motor.

In one type of electric motor drive, an electronic switching or valve device, for example, a thyratron or a silicon controlled rectifier, is caused to break down at a particular point in the cycle of an alternating current impressed thereon to conduct for the remaining portion of a half cycle and energize the motor with a current of a given polarity. The average value of the energizing current for the motor in this type of system is controlled by varying the point in the cycle of the alternating current wave at which the valve or switching device is rendered conductive. Commonly, in reversible motor drives, one valve device is rendered conductive during the half wave cycles of one polarity of the alternating current power wave to effect operation of the motor in one direction and when operation of the motor in the opposite direction is desired, a second electric valve is rendered conductive during the alternate half-wave cycles to energize a motor with a current of opposite polarity.

As is well understood by those skilled in the art, thyratrons and silicon controlled rectifiers are caused to break down and conduct, when the principal electrodes are of the proper polarity, by applying a control signal of a certain magnitude to the control electrode of the valve. Thyratrons and silicon controlled rectifiers have what is known as a critical firing curve which indicates the magnitude that the control signal must possess for a given potential applied to the principal electrodes and when this magnitude is reached or exceeded, the valve will switch or break down and will be conductive until the voltage on the principal electrodes falls to zero or in certain types of valve devices, until a signal is applied to the control electrode to extinguish the conduction through the valve. In the latter type of device, the valve will also cease conducting if the voltage on the main electrodes does drop to zero.

Problems have been encountered in accurately controlling the portion of the cycle in which the electric valves are rendered conductive, i.e., switched. In order to achieve accurate motor control, it is necessary to be able to accurately control the point within each cycle at which the valve is rendered conductive. Heretofore, spurious signals have created a problem and particularly when an analogue control signal is applied to the control electrode and the control electrode is to effect a breakdown of the valve when the control signal achieves a predetermined magnitude. A spurious signal level combined with the control signal can easily effect a triggering of the valve device at an early point in the cycle if it increases the magnitude of the control signal or if opposing the control signal it would delay the triggering. Moreover, spurious signals often have a sufficient magnitude to in themselves effect a triggering of the valve device even though the control signal is not close in magnitude to that level where it will effect a switching of the valve device.

Accordingly, an important object of the present invention is to provide a new and improved control system wherein an electronic switching device such as a thyratron or silicon controlled rectifier is rendered conductive at a precise point in a cyclically varying wave impressed thereacross in response to an analogue control signal by circuit means which effectively isolates the control signal from the electronic switch device, provides positive switching operation and eliminates or minimizes false switching due to spurious signals.

Another object of the present invention is to provide a new and improved reversible motor control system wherein a control signal in a motor "stopped" condition has a characteristic which would cause the motor to be alternately energized to operate in opposite directions, the control circuit being such that an electronic gate in the circuitry responsive to the control signal may be conditioned to render the control signal ineffective.

A further object of the present invention is to provide a new and improved motor control circuit in which a valve device is rendered conductive during a greater or lesser portion of an alternating current half-cycle to control the speed of the motor and wherein the switching of the valve is effective in response to the magnitude of a cyclically varying control signal by a threshold circuit which switches conditions in response to the control signal increasing and decreasing to switching levels to provide an output signal, the duration of the signal output is varying as a function of the control signal, the circuit being so constructed and arranged that a pulse of constant width is derived from the output signal for opening a gate to pass pulses from a pulse generator to switch on the valve device as dictated by the control signal.

Yet another object of the present invention is to provide a new and improved motor control circuit of the type wherein an electric valve is rendered conductive for a variable portion of a cycle of a cyclically varying power source connected across the principal electrodes to control the speed of the motor and which is so constructed and arranged that the system will have a fast response to changes in motor speed in order to maintain the speed substantially constant.

In accordance with the present invention, these and other objects are achieved by means of a control circuit including switching means, e.g., an electric valve device, for interconnecting a cyclically varying power source and a load, such as a motor, to be energized for a variable portion of an impressed cyclically varying potential in response to control signals applied to a triggering element thereof. A gating circuit having a plurality of inputs and an output element is provided with the output element being connected to apply a pulse to the triggering element of the switching means. An input of the gating circuit is connected to the output of a pulse generating means, whereby a continuous train of pulses is applied to the gate. Another input of the gate receives pulses from the output of a level-detector circuit, such pulses being applied to the gate upon the presence of an input to the level-detector which is equal to or greater than a given threshold level. The input to the level detector is a variable control signal whose magnitude is controlled to exceed the threshold value of the level detector circuit at the point in the cycle of the varying potential across said valve device and load at which value the device is to be rendered conductive.

Where the triggering circuit of this invention forms a part of a servodrive system, the variable control signal is generally the resultant of a command signal, a bias signal and a feedback signal from a tachometer or other monitoring device which is connected to and driven by the servomotor, the latter comprising the load for the triggering circuit. Further, it is often desirable to provide a pair of triggering paths connected to opposite sides of the servomotor, whereby the servomotor may be energized in either direction by reversing the connections of the aforementioned power source thereto. In such a circuit, the gate preferably has an additional input which is capable of rendering the gate inoperative to pass pulses in response to said level detector. The additional gate input may be controlled by a sensing circuit which closes the gate in the absence of a control signal.

With the above considerations and objects in mind, the invention itself will now be described in connection with a preferred embodiment thereof given by way of example and not of limitation, and with reference to the accompanying drawings, in which:

FIG. 1 is a circuit block diagram of a preferred embodiment of the present invention;

FIG. 2 is a detailed schematic diagram of the circuit shown in block form in FIG. 1;

FIG. 3 is a schematic circuit diagram of an alternate embodiment of a portion of the circuit shown in FIG. 2; and FIG. 4 is a characteristic curve of a tunnel diode.

Referring now particularly to FIG. 1, a servomotor 10 is shown as connected to a power supply 16 by two switching or valve means 12 and 14 so as to energize the motor 10 for operation in one direction or another depending upon the respective switch or valve which is actuated.

The operation of the motor 10 is monitored by a tachometer 18 which is connected to and driven by the motor 10 as indicated by the dash line 20. The output of tachometer 18 is applied by way of connection 22 to the input circuitry of a preamplifier 24, this tachometer output signal provides a velocity feedback signal for the servomotor system of FIG. 1. In the preferred embodiment, the signal from the tachometer is an A.C. signal having a magnitude and sense dependent on the speed and direction of rotation, respectively.

A command or reference signal which indicates the speed and direction of operation for the motor 10, an A.C. signal in the illustrated embodiment, is applied to a terminal 26 of the input circuitry of preamplifier 24, and as will be more fully explained in connection with the description of FIG. 2, the command signal applied at terminal 26 and the velocity feedback signal on lead 22 are combined in a bucking relationship in the input circuitry of preamplifier 24 when the motor is operating in the direction indicated by the command signal.

The amplified error signal output of preamplifier 24 is applied as one input to a level-detector 28, along with a second input thereto in the form of an A.C. bias signal supplied by bias control generator 30. When the level of the combined input, i.e., the resultant control signal, to level-detector 28 equals or exceeds the threshold of the detector, an output signal is applied to an input 32 of AND gate 34. A second input 35 to gate 34 is supplied by a pulse generator 36, which supplies a continuous train of pulses to the gate.

The output of gate 34 is amplified in amplifier 38 and applied as the control signal input to switch or valve 12 to control the energization of motor 10 from power source 16.

The error signal output of preamplifier 24 is also applied as one of the inputs to a second level detector 40. Similarly, the output of bias generator 30 is also applied as an input to level-detector 40, and the combined input to detector 40 serves to provide a signal at an input element 42 of a second AND gate 44 when the level of the combined input to detector 40 exceeds the threshold thereof.

Pulse generator 36 also supplies a second input 45 for gate 44, the gated output of which is amplified in amplifier 46 and applied as a controlling input to switch 14. As was previously stated, switch or valve 14 controls the energization of motor 10 by power source 16, but in the opposite sense of motor rotation from that achieved by energization of motor 10 through switch 12.

In the operation of the circuitry of FIG. 1, the command signal at terminal 26 and the velocity feedback signal on lead 22 are combined and amplified in preamplifier 24. The output of preamplifier 24 is then combined with the A.C. bias signal from bias generator 30, the combination of such signals being effected in the respective input circuit of level-detectors 28 and 40, and it is these two composite signals which constitute the control signals for forward and reverse energization of motor 10 through the remaining circuitry.

The input signals in each of the level-detectors 28 and 40 is applied to the threshold detector, and when the desired triggering level is reached, the level-detector in question undergoes a sharp change in operation so as to supply an output signal which controls the opening of the respective gates 34 and 44.

As either gate is opened, the pulse generator 36 supplies pulses at a high recurrence rate through the open gate, and these pulses are amplified in the respective amplifiers 38 and 46 and applied to the control electrodes in the respective valves 12 and 14.

In supplying a continuous train of pulses from generator 36 through the respective gates 34 and 44, the circuit of this invention minimizes the chances of delay or failure in the operation of the valves or switches 12 and 14 when triggering takes place. This is based upon the fact that at a given moment when triggering is called for, the switch in question may not provide an immediate response. If only one pulse were passed through the gate to the switch in question, the switch might, as a result, fail to be triggered. However, with a continuous train of pulses of high repetition rate being supplied by pulse generator 36 through the open gate, even if the first pulse passing through the gate fails to trigger the switch in question, a second or later pulse is available to achieve the operation. In view of the high repetition rate in the pulse generator 36, the time delay, if any, is negligible for most applications.

The combination of the command and velocity feedback signals with the A.C. bias signals, the passage of the composite combinations thereof through threshold or level-detectors and the application of the output of such level-detectors to AND gates which serve to pass a train of high repetition rate pulses to the switching elements in control of a servomotor provide a combination of elements which provides an improvement over the operation of the devices of the prior art. One of the most outstanding advantages of the present invention is, as was previously stated, the degree of isolation achieved between the analog input to the system and the electronic switching devices which control the motor, so that not only are the switching elements, whether they be thyratrons or silicon controlled rectifiers, triggered in a more positive and exact manner, but misfiring of the switch elements as a result of spurious signals is prevented.

FIG. 2 shows in detail circuitry corresponding to the block diagram of FIG. 1, and legends are applied to FIG. 2 identifying the several portions of the circuit with the respective blocks of the diagram of FIG. 1.

Referring to FIG. 2, the armature circuit of the motor 10 is energized from alternating current power lines L1, L2 through a power amplifier or switching devices including electric rectifying valves having principal electrodes which will conduct in one direction when a predetermined voltage is applied to a control element of the valve. The valves are shown as gas rectifying tubes, or thyratrons, 50, 51 for rectifying the current supplied to the armature. The thyratrons 50, 51 are connected in back-to-back relationship so that the tubes are oppositely phased and have their plates going positive on different half cycles of the alternating current appearing across lines L1, L2. The tube 50 has its plate 50a connected to L2 through the motor 10 and its cathode 50b is connected to plate 51a of tube 51 by a connection 52 having a junction 53 to L1. The cathode 51b of thyratron 51 is connected to L2 through the motor 10. From the described circuit, it will be understood that current flow in the motor circuit through tube 50 can take place only on the particular half cycle where L2 is positive with respect to L1 and the current flow will be from L2 to L1. On the other hand, current flow through the tube 51 can only take place on the half cycle where L1 is more positive than L2 and current flow will then be in a reverse direction through the armature from L1 to L2 through the tube 51. Therefore, if only tube 50 conducts, the motor operates in one direction and if only tube 51 conducts, the motor will operate in the opposite direction. If both the thyratrons 50 and 51 are conductive on their respective half cycles, the motor will not operate and is at a standstill if each is conductive for the same period during its half cycle, since the average armature current is zero, but if one particular thyratron conducts for a greater portion of its respective half cycle, there will be an average current flow in the direction that the particular thyratron conducts and the motor will rotate in the direction which corresponds to that direction of current flow.

In the illustrated embodiment, the thyratrons are operated so that at a normal standstill condition each will conduct for a short period at the end of their respective cycles, with the period of conduction for each thyratron being the same. The valves 50, 51 conduct for a short period at the end of their respective conducting cycles in response to the control signal from the bias source 30. The bias source 30 comprises a transformer 56 having its primary connected to an A.C. source and a secondary 57. Potentiometer resistances 58, 60 are connected in series across the secondary 57 and the center of the secondary 57 is grounded as well as the junction between the resistances 58, 60. The potentiometer tap 58a on the potentiometer resistance 58 is connected to the input of the level detector 28 and a resistance 62 in the level detector connects the potentiometer tap 58a to the base of a transistor 64 of the NPN type. The transistor 64 is rendered conductive on the half wave cycle of the bias source where the potentiometer resistance 58a is positive with respect to ground.

The output circuit of the transistor 64 includes the collector 64a and the emitter 64b of the transistor and the collector 64a is connected to the base of a transistor 66 of the PNP type. The connection between the collector 64a and the base of the transistor 66 includes a variable resistor 67 and the base of the transistor 66 is also connected to the positive side of the power supply by a tunnel diode 70.

The output circuit of the transistor 66 includes the emitter collector electrodes of the transistor, the collector electrode being connected to ground through a load resistor 72. The output signal from the transistor 66 is taken from its collector which is coupled by a capacitor 73 to the base of an output transistor 75 through an input resistor 76. The junction between the capacitor 73 and the resistor 76 is connected to ground by a reversely poled diode 78.

In operation it will be appreciated that as the bias signal from the secondary 58 is going positive relative to ground, the base of transistor 64 will become increasingly positive to cause the transistor to conduct. As the transistor becomes increasingly conductive, the collector thereof becomes increasingly negative and current flows through a resistor 79 connecting the collector 64a and transistor 64 to the positive side of the power supply and through the tunnel diode 70. The current through the tunnel diode 70, as it increases from zero with the increased conduction of the transistor 64, is below the peak current for the tunnel diode and the tunnel diode operates on the steep portion of its characteristic curve shown in FIG. 4 before the peak current value which is that value immediately before the portion of its characteristic curve where the tunnel diode exhibits a negative resistance. The circuit characteristics of the output circuit of the transistor 64 and the resistor 67 are such that at a selected threshold value for the input signal to the transistor 64, the current through the tunnel diode 70 is at its peak current value so that an infinitesimally small increase in current will cause the tunnel diode to switch to an operating point B on its operating curve with an attendant decrease in current but increase in voltage. Until the switching action of the tunnel diode 70 occurs, the current in the input circuit for the transistor 66 is very small and the transistor 66 for all practical purposes has no output. However, when the switching action takes place in the tunnel diode 70, the voltage drop across the tunnel diode 70 increases to a point such that the input current to the transistor 66 has a magnitude that drives the transistor into saturation to switch the potential at the collector to a maximum positive level. When the input signal to the transistor 64 decreases, the voltage across the tunnel diode will decrease until a point C is reached on the tunnel diode characteristic curve where the tunnel diode will switch back to a point D on the portion of its curve before the peak current to render the transistor 66 non-conductive. The characteristics of the transistor and tunnel diode are such that the transistor will operate in its saturated range for the voltage across the tunnel diode as the tunnel diode approaches point D. Thus, a square wave output pulse is derived from the output of transistor 66. This output is subjected to a clipping action by a clipping diode 83 and applied to the transistor 75 through the capacitor 73 which constitutes part of a differentiating circuit. The condenser 63 will differentiate the leading edge of the pulse to provide a positive going pulse to the base of transistor 75. The diode 78 provides a discharge path for the condenser and a shunt circuit for negative going pulses.

The pulse to the base of transistor 75 is triangularly shaped and has a constant width and preferably the transistor 75 operates to convert this to a square wave pulse of constant width. The collector of transistor 75 is connected to one input of the AND gate 34. The output of the AND gate 34 is connected to the input of the amplifier 38 which comprises transistors 77, 80 and a transformer 81 having its primary connected in the load circuit of the output transistor 80. The transformer 81 has a secondary coil 82 which is in the grid circuit of the thyratron 50, the grid circuit of the thyratron 50 being such that when a pulse occurs in the secondary 82 in response to a pulse applied to the input of the amplifier 38, the thyratron 50 will be rendered conductive provided its anode is positive with respect to its cathode. Accordingly, the control signal to the level detector must have a phase relationship with respect to the alternating current wave impressed across the thyratrons 50, 51 such that the threshold value of the positive going input signal to the transistor 64 is reached at the point in time which corresponds to the point in the alternating current wave impressed on the thyratron 50 where the thyratron 50 is to be conductive. The bias signal from the source 30 is shifted by 120° with respect to the power wave and the threshold level is reached at the end of the half-wave cycle where the anode of the thyratron 50 is positive with respect to its cathode. By modulating the bias signal from the bias generator, the threshold value of the input to the transistor 64 and the pulse to the AND gate 34 can be made to occur at an earlier point in the half-wave conductive cycle of the thyratron 50 to cause the thyratron 50 to conduct for a larger portion of its conductive half-cycle. By controlling the phase of the pulse to the AND gate with respect to the power wave, the thyratron 50 will conduct either a larger or lesser amount of current within its conductive half-cycle.

The level detector 40, the gate 44 and the amplifier 46 are substantially identical to the level detector 28, the gate 34 and the amplifier 38 and the description thereof will not be repeated. Suffice it to say that the bias signal from the bias circuit is an A.C. signal and the base of the transistor 64 goes positive on one half wave of the bias signal, while the base of the corresponding transistor 64' in the circuit for controlling the firing of thyratron 51 goes positive on the alternate half cycle by reason of the fact that the junction between the potentiometer resistances 58, 60 is ground. Therefore the voltage derived between the potentiometer tap 60a and ground is 180° out of phase with the voltage derived between the potentiometer 58a and ground and the control pulse to the AND gate 44 will be shifted by 180° and will occur at the end of the halfwave power cycle where the principal electrodes of the thyratron 51 are of proper polarity for conduction. Consequently the bias signal will be of proper phase to cause the thyratron 51 to conduct during the last part of the half-wave cycle thereacross and if modulated to reach its threshold value at an earlier time in the half-wave cycle, the thyratron 51 will conduct at an earlier point.

The bias signal from the bias source 30 is modulated by the combined command and feed-back signal to provide a control signal which shifts in phase and varies in amplitude in accordance with variations in the difference signal resulting from the combining of the command and feedback signal. The command signal is applied to the input terminal 26 and comprises an alternating current signal which is in phase with the alternating current wave impressed upon the thyratrons 50, 51. The feedback signal from the tachometer 18 is applied to a terminal 26a and is 180° out of phase with the command signal. The terminals 26, 26a are connected by respective resistors 85, 86 to a junction 87 which is capacitively coupled to a transistor 90 forming the input transistor of the preamplifier 24. The transistor 90 is biased so that the output of the transistor 90 follows the alternating current input wave thereto and the voltage on its collector will vary as sine wave for a sine wave input to the transistor. The output will, however, be superimposed upon a D.C. level provided by the bias on the transistor 90. The collector of the transistor 90 is connected to the base of transistors 91, 92 of the preamplifier 24, the principal electrodes, i.e., the emitters and collectors, of the transistors 91, 92 being connected in series with the transistor 91 being an NPN transistor and the transistor 92 being a PNP transistor. The transistor 91 has its collector connected to the positive side of the power supply and its emitter connected to the emitter of the transistor 92, which, in turn, has its collector connected to the negative side of the power supply. The output from the preamplifier is taken from a junction 95 between the emitters of the transistors 91, 92. In the absence of an input signal to the preamplifier 24, the transistors 91, 92 are conducting and their conduction is varied by the A.C. component of the output of the transistor 90. If the component is increasing, the conduction of the transistor 91 is increased to raise the voltage of the junction 95 and when the component is decreasing, the transistor 91 is rendered less conductive and the transistor 92 increasingly conductive to lower the potential of the junction 95. The junction 95 is coupled by a capacitor 96 to the level detector 28 and to the level detector 40. The capacitor 96 is connected to the base of the transistor 64 of the level detector 28 by a resistor 100 and to the base of transistor 64' by a resistor 101. An alternating current error signal is derived at the condenser and is in phase or out of phase with the power wave. The error signal when in phase with the power wave will combine with the bias signal to provide a resultant control signal which is phase shifted and has an amplitude such that the control signal to the level detector will achieve its threshold level at an earlier point in the power wave half-cycle when the thyratron 50 is conductive. The amount of phase shift and the point at which the threshold value is reached depends upon the amplitude of the error signal. However, if the sense of the error signal is reversed so that it is 180° out of phase with the power wave, then the error signal will combine with the bias signal to render the transistor 64' conductive during that portion of the power wave when the anode of thyratron 51 is positive with respect to its cathode. Accordingly, when the threshold level is reached and the tunnel diode 70' switches to apply an input pulse to the gate 44 to open the gate pulses from the pulse generator 56, the thyratron 51 will be rendered conductive. The direction of operation of the motor is, therefore, controlled by applying a command signal in phase with the power wave or 180° out of phase and the magnitude of the signal will determine the rate. The sense of the feedback signal depends on the direction of rotation of the motor and will automatically shift 180° when the motor changes direction of rotation.

It can now be seen that the application of a command signal to the input terminal 26 will result in an error signal, which is combined with the bias signal to provide a control signal which is connected to the input of the level detectors and which will have an amplitude that exceeds the threshold value of the level detector circuit at a point in the power wave impressed across the thyratron which is to be rendered conductive which is dependent on the magnitude of the error signal. If the error signal has one sense, the thyratron 50 will be rendered conductive through the level detector 28 and if of the opposite sense the thyratron 51 will be rendered conductive through the level detector 40. As the motor operates, a feed back signal will result which bucks the command signal and will tend to reduce the error signal to zero.

As the input to the transistor 66, 66' rises and falls to levels to switch the tunnel diodes 70, 70' on and off, the output signals from the transistors 66 and 66' comprise a pulse of approximately square shape whose width varies with the time duration of the input signal between the switching levels for the tunnel diodes. This pulse of variable width which is preferably less than 180 electrical degrees, with a steep leading edge which is differentiated to provide a constant width pulse, characterized by a steep front, which provides the desired degree of precision in turning on and off the gates 34 and 44. In the event that the output pulses from the transistors 66, 66' have a width greater than 180°, the differentiating circuit will limit the pulse signal to the gates 34, 44 to a pulse of constant width which occurs only within one half-cycle of the power wave. The pulses to the gates 34 and 44 are opened in precise timing with the switching of the tunnel diodes associated therewith so as to provide a triggering pulse at the respective thyratron grids with little or no delay. As is apparent, the thyratrons, once switched into a conductive state, remain conducting until the applied voltage from A.C. source 16 again reaches that portion of the A.C. cycle at which the amplitude is low enough to extinguish the tube.

It has been found that with an A.C. command signal, as the magnitude thereof increases, the trailing edge output pulse from the transistors 66, 66' tends to move into the half cycle of the power wave following that in which the leading edge occurs. When the leading edge of the pulse from the transistor 66 or the transistor 66' occurs in the half cycle where the plate of the corresponding thyratron is negative, it indicates that the thyratron is to be non-conductive and if the pulse continues into the next half cycle of the power wave the thyratron will fire since its plate is now positive. The use of the differentiating circuits between the transistors 66, 66' and the gates 34, 44 to provide constant width pulses in response to the leading edge of the pulse from the transistors 66, 66' overcomes this problem.

The invention has been described with reference to an A.C. command signal but it will be recognized by those skilled in the art that the command signal may also be a direct current signal. In this event, the direct current signal when of one polarity will combine with the A.C. biasing wave to cause the input to one of the level detectors to reach the threshold level during the half cycle of the power wave where the plate of the corresponding thyratron is positive to fire the thyratron and for the other thyratron the threshold level will be reached in the half-cycle of the power wave when its plate is negative so as to render it non-conductive. Conversely the other thyratron will be fired if the polarity of the D.C. signal is reversed. In each case, the phase of the threshold magnitude of the input signal relative to the power wave and therefore the time of firing is variable by varying the magnitude of the D.C. signal. With a direct current command signal, the trailing edge of the pulses from the transistors 66, 66' does not tend to fall in the half-wave cycle following the half-wave cycle in which the leading edge occurs as in the case of an A.C. command signal.

Instead of the thyratron switching elements 50 and 51 as shown in FIG. 2, silicon controlled rectifiers may be employed as the switching elements. FIG. 3 shows exemplary circuitry whereby a silicon controlled rectifier may replace the thyratron of FIG. 2. Final amplifier stage 80 of amplifier 38 includes the transformer 81, as in FIG. 2. In FIG. 3, however, the secondary of the transformer 81 is shunted by a diode 110 which is connected between the triggering elements of silicon controlled rectifier 111. The power circuit including power source 16 in FIG. 2 is connected to the power elements of silicon controlled rectifier 111 through a back-up rectifier 112.

The invention has been described in some detail, and particularly with reference to its application to an alternating current, single-phase, half-wave servodrive system. However, it will be apparent to those skilled in the art that the invention is also applicable to electronic triggering circuits for other uses not necessarily connected with servodrive systems but which require the improved triggering characteristics of the present invention. Hence, the invention is not to be considered as limited to the particular details given or to the specific application to which reference has been made during the description of the circuit, except insofar as may be required by the scope of the appended claims.

What is claimed is:

1. In an electronic control system wherein an electronic switching device connects a load and a power source for supplying a variable current to the load and is to be rendered conductive in response to a triggering signal at a particular point in the cycle of a cyclically varying voltage wave impressed thereacross, the particular point in the cycle at which the device is rendered conductive being variable to vary the current supplied to the load, an electronic gate means having a plurality of input elements and an output element connected to the valve device to trigger the latter in response to a pulse on the output element, pulse generating means having an output connected to one input of said gating means for applying thereto a train of pulses, circuit means providing a cyclically varying analogue control signal which is to effect a switching on of said device in response to the analogue signal having a predetermined magnitude, the phase of said predetermined magnitude being variable with respect to said voltage wave, and level detector means responsive to said analogue control signal and having an output connected to an input element of said gating means and providing an output signal to said gating means in response to said predetermined magnitude of said control signal to open said gating means to pulse said switching device from said pulse generating means.

2. In an electronic control system as defined in claim 1 wherein said output signal from said level detector means is of sufficient duration to pass at least two pulses from said pulse generating means.

3. In an electronic control system as defined in claim 1 wherein said cyclically varying voltage wave is a sine wave and said control signal comprises a phase displaced sine wave of the same frequency of said voltage wave.

4. In an electronic control system as defined in claim 2 wherein said output signal is a pulse less than 180 electrical degrees.

5. In an electronic control system as defined in claim 4 wherein said output pulse is of constant width.

6. In an electronic control system as defined in claim 1 wherein said level detector means comprises a threshold circuit providing a square pulse and a differentiating circuit for differentiating the leading edge of said square pulse to provide the output pulse from said level detector means.

7. In an electronic control system as defined in claim 6 wherein said output pulse from said level detector means is a pulse of constant width.

8. A motor control circuit including an electric valve device having a pair of main electrodes interconnecting a power source and the motor and a control electrode to which a triggering signal is to be applied to render said valve conductive for a portion of a cyclically varying voltage wave applied to the main electrodes, the point in the cycle in which said valve is rendered conductive determining the average current applied to the load, a pulse generator for generating a train of pulses, a gate having a plurality of inputs and an output connected to pulse said control electrode to render said valve conductive, means connecting the output of said pulse generator to one of said inputs, signal circuit means providing a cyclically varying analogue control signal of the same frequency of said voltage wave, a threshold circuit responsive to the level of said control signal and providing an output signal for conditioning said gate to pass the pulses from said pulse generator when said control signal is at least at a predetermined level, and circuit means connecting the output of said threshold circuit to one input of said gate, said signal circuit means providing said control signal comprising first circuit means providing a bias signal and second circuit means for combining a variable signal with said bias signal to provide said control signal whereby said control signal reaches said predetermined level at a point in the cycle of said power wave which varies in accordance with the magnitude of said variable signal.

9. A motor control system as defined in claim 8 wherein said second circuit means further comprises an input circuit means for a command signal and electrical means responsive to the speed of said motor and providing a feed back signal which is a function of motor speed, said signal circuit means also including means combining said command, feed back and bias signals to provide said control signal.

10. In a motor control system as defined in claim 9 wherein said control signal varies cyclically as a sine wave of a frequency which is the same as said power wave and is phase displaced therefrom.

11. A motor control system as defined in claim 9 wherein said threshold circuit comprises threshold circuit means which changes from one conductive state to another when said control signal raises to a predetermined level and changes from said other conductive state to the first conductive state when said control signal falls to a predetermined level to provide a square pulse, and means for differentiating the leading edge of said square pulse to provide the output signal from said threshold circuit.

12. In a motor control system as defined in claim 11 wherein said output signal is a pulse of constant width.

13. In a motor control system as defined in claim 8 wherein said output signal is a pulse of constant width.

14. In a motor control system for a reversible motor, first and second electric valves having principal electrodes connected in back-to-back relationship for supplying current to the motor on alternate cycles of an A.C. current power wave to effect operation of the motor in a respective direction, means connecting said valves and motor in series relationship across an A.C. power supply, a cyclically varying control signal for controlling the conduction of said valves, said valves each having a control element to which a control signal is applied when the principal electrodes of the valves have a predetermined polarity with respect to each other to render the valves conductive, the valves continuing to conduct until the voltage across the principal electrodes drops to zero, a cyclically varying A.C. bias signal phase displaced with respect to said power wave and of the same frequency as said power wave for effecting conduction of said valve devices for a small portion only of the half cycle during which the principal electrodes of the valves have the proper polarities, circuit means for combining with said bias signal an A.C. error signal to provide a control signal whose amplitude with respect to the amplitude of the power wave at any given point in the power wave cycle is a function of the amplitude of the error signal, threshold circuit means corresponding to each of said valves and responsive to said control signal when of a particular phase to provide an output signal for firing the corresponding valve when said control signal has a magnitude which exceeds a predetermined level, a pulse generator for generating a train of pulses to be applied to said valves, gating means corresponding to each of said valves, each gating means having a plurality of inputs and an output element connected to trigger said valves, circuit means connecting the output of said pulse generator to one input of each of said gating means and the output of the corresponding threshold detector circuit to another input of the gating means to condition the gate to pass pulses from said pulse generator in response to an output from the corresponding level detector, each of said gating means having a third input which may selectively be conditioned or non-conditioned to render said threshold detector means and said pulse generator means effective or ineffective to apply a triggering signal to the valve means through said gating means.

15. A control circuit including an electric valve device having a pair of main electrodes interconnecting a power source and a load and a control electrode to which a triggering signal is to be applied to render said valve conductive for a portion of a cyclically varying voltage wave applied to the main electrodes, the point in the cycle in which said valve is rendered conductive determining the average current applied to the load, a pulse generator for generating a train of pulses, a gate having a plurality of inputs and an output connected to pulse said control electrode to render said valve conductive, means connecting the output of said pulse generator to one of said inputs, circuit means providing a cyclically varying control signal of the same frequency of said voltage wave, a threshold circuit comprising a tunnel diode responsive to the level of said control signal and providing an output signal for conditioning said gate to pass the pulses from said pulse generator when said control signal is at least at a predetermined level, said tunnel diode switching between conductive states when said control signal rises and falls to switching levels to provide an output pulse having a time duration which is a function of said control signal switching levels, a differentiating circuit connected to the output of said threshold circuit to differentiate the leading edges of the pulses therefrom to provide a gating pulse, circuit means connecting the output of said differentiating circuit to one input of said gate, and signal circuit means providing said control signal comprising first circuit means providing a bias signal and second circuit means for combining a variable analogue signal with said bias signal to provide said control signal whereby its said predetermined level is reached at a point in the cycle of said power wave which varies in accordance with said variable analogue signal.

16. A control system as defined in claim 15 wherein said gating pulse is a pulse of constant width.

17. In an electronic control system for an electronic switching device which connects a load and a power source for supplying current to the load and is to be rendered conductive in response to a triggering signal to conduct for a portion of a cycle of a cyclically varying voltage wave applied to said device from said source with the particular point in the cycle at which said device is rendered conductive being variable to vary the current supplied to the load, circuit means providing a cyclically varying analogue control signal which is to effect a switching on of said device in response to the analogue signal having a predetermined magnitude, the phase of said predetermined magnitude with respect to said voltage wave being variable, and level detector means responsive to said analogue signal and having an output in response to said predetermined magnitude of said control signal, and circuit means responsive to said output from said level detector means for applying a plurality of pulses to said control element to trigger the latter.

18. In a control system as defined in claim 17 wherein said circuit means comprises a transformer and first circuit means connecting the primary of said transformer to the output of said level detector means and second circuit means connecting the secondary of said transformer to said control element.

19. In a control system as defined in claim 17 wherein said circuit means responsive to said output comprises a pulse generator for generating pulses and means responsive to the output of said level detector for rendering said pulse generator effective to pulse said control element.

20. In a control system as defined in claim 19 wherein the output from said level detector has a constant time period and said circuit means responsive to said output is effective to apply pulses from said generator to said control element during said period.

21. In a control system as defined in claim 19 wherein said circuit means responsive to said output comprises a transformer and first circuit means connecting the primary of said transformer to the output of said level detector means and second circuit means connecting the secondary of said transformer to said control element.

22. In a motor control system for a reversible motor, first and second electric valves having principal electrodes connected in back-to-back relationship for supplying current to the motor on alternate cycles of an A.C. current power wave to effect operation of the motor in a respective direction, means connecting said valves and said motor in series relationship across an A.C. power supply, a cyclically varying control signal for controlling the conduction of said valves, said valves each having a control element to which a control signal is applied when the principal electrodes of the valves have a predetermined polarity with respect to each other to render the valves conductive, the valves continuing to conduct until the voltage across the principal electrodes drops to zero, a cyclically varying A.C. bias signal phase displaced with respect to said power wave and of the same frequency as said power wave for effecting conduction of said valve devices for a small portion only of the half cycle during which the principal electrodes of the valves have the proper polarities, circuit means for combining with said bias signal an A.C. error signal to provide a control signal whose amplitude with respect to the amplitude of the power wave at any given point in the power wave cycle is a function of the amplitude of the error signal, threshold circuit means corresponding to each of said valves and responsive to said control signal when of a particular phase to provide an output signal for firing the corresponding valve when said control signal has a magnitude which exceeds a predetermined level, additional circuit means including a pulse generating means for generating pulses for applying a plurality of pulses to a control element in response to an output signal from the corresponding threshold means, said additional circuit means including gate means conditioned during operation to effect the pulsing of a control element by said pulse generating means when an output signal is present on the corresponding threshold detector, said gate means comprising a gate corresponding to each control element and threshold detector, each of said gates having an input which is selectively conditioned to render the circuit means effective or ineffective to apply pulses to the corresponding control element in response to an output signal from the corresponding level detector.

References Cited
UNITED STATES PATENTS

| | | | |
|---|---|---|---|
| 2,803,793 | 8/1957 | Wible | 318—314 |
| 3,308,307 | 3/1967 | Moritz | 318—20.480 |

ORIS L. RADER, *Primary Examiner.*

J. J. BAKER, *Assistant Examiner.*